US008280617B2

(12) United States Patent
Young et al.

(10) Patent No.: US 8,280,617 B2

(45) Date of Patent: Oct. 2, 2012

(54) MONITORING A MOBILE DEVICE

(75) Inventors: Stanley E. Young, Centreville, MD (US); Philip Tarnoff, Rockville, MD (US); Nicholas J. Ganig, College Park, MD (US)

(73) Assignee: University of Maryland, College Park, MD (US)

( * ) Notice: Subject to any disclaimer, the term of this patent is extended or adjusted under 35 U.S.C. 154(b) by 743 days.

(21) Appl. No.: 12/348,661

(22) Filed: Jan. 5, 2009

(65) Prior Publication Data

US 2009/0210141 A1 Aug. 20, 2009

Related U.S. Application Data

(60) Provisional application No. 61/018,724, filed on Jan. 3, 2008, provisional application No. 61/026,565, filed on Feb. 6, 2008, provisional application No. 61/060,304, filed on Jun. 10, 2008.

(51) Int. Cl.
*G06F 19/00* (2011.01)

(52) U.S. Cl. ........................................ 701/119; 340/934

(58) Field of Classification Search .................. 701/117, 701/119

See application file for complete search history.

(56) References Cited

U.S. PATENT DOCUMENTS

| | | | |
|---|---|---|---|
| 5,999,131 | A | 12/1999 | Sullivan |
| 6,297,737 | B1 | 10/2001 | Irvin |
| 6,427,113 | B1 | 7/2002 | Rahman |
| 6,505,114 | B2 | 1/2003 | Luciani |
| 6,603,977 | B1 | 8/2003 | Walsh et al. |
| 6,791,473 | B2 | 9/2004 | Kibria et al. |
| 6,819,286 | B2 | 11/2004 | Armbruster et al. |
| 6,901,264 | B2 | 5/2005 | Myr |
| 6,911,918 | B2 | 6/2005 | Chen |
| 6,920,329 | B2 | 7/2005 | Kennedy, Jr. et al. |
| 6,965,325 | B2 | 11/2005 | Finnern |
| 7,088,237 | B2 | 8/2006 | Arcens |
| 7,155,238 | B2 | 12/2006 | Katz |
| 7,224,983 | B2 | 5/2007 | Budka et al. |
| 7,382,274 | B1 | 6/2008 | Kermani et al. |
| 2002/0107634 | A1* | 8/2002 | Luciani ......................... 701/117 |
| 2002/0128000 | A1* | 9/2002 | do Nascimento, Jr. ........ 455/414 |
| 2005/0088318 | A1* | 4/2005 | Liu et al. ....................... 340/902 |
| 2007/0257782 | A1* | 11/2007 | Etcheson ................... 340/425.5 |
| 2009/0287404 | A1* | 11/2009 | DeKock et al. ............... 701/117 |

OTHER PUBLICATIONS

Akihika Sugiura et al., "In Traffic Jam IVC-RVC System for Its Using Bluetooth," IEEE Transactions on Intelligent Transportation Systems, vol. 6, No. 3, Sep. 2005, pp. 302-313.
PCT International Search Report (PCT/US09/30131), mailed Feb. 13, 2009 (3 total pages).
PCT Written Opinion of the International Search Authority (PCT/US09/30131), mailed Feb. 13, 2009 (7 total pages).
Nicholas J. Ganig, "Rapid Detection of Bluetooth Devices," Center for Advanced Transportation Technology (CATT), University of Maryland, College Park, Oct. 8, 2008 (5 total pages).

(Continued)

*Primary Examiner* — Behrang Badii
*Assistant Examiner* — Shardul Patel
(74) *Attorney, Agent, or Firm* — Fish & Richardson P.C.

(57) ABSTRACT

Devices, systems, and methods for monitoring traffic, such as vehicle traffic on a roadway, using identification information acquired using a Bluetooth protocol. A sensor is configured to scan for discoverable Bluetooth devices within a flow of vehicle traffic and to create a log of identified Bluetooth devices. A system includes multiple sensors at known locations along a route and is operable to identify a Bluetooth device identified at multiple sensors.

26 Claims, 6 Drawing Sheets

OTHER PUBLICATIONS

Gergely V. Zaruba et al., "Accelerating Bluetooth Inquiry for Personal Area Networks," GLOBECOM 2003, Department of Computer Science and Engineering, The University of Texas at Arlington, Department of Computer Science, The University of Texas at Dallas, pp. 702-706.

Jason S. Wasson et al., "Real-Time Travel Time Estimates Using MAC Address Matching," Indiana Department of Transportation, Purdue University, Mar. 18, 2008, pp. 1-12.

Brian S. Peterson et al., "Bluetooth Inquiry Time Characterization and Selection," IEEE Transactions on Mobile Computing, vol. 5, No. 9, Sep. 2006, pp. 1173-1187).

Hazem Ahmed et al., "A Bluetooth- and WI-FI-Based Mesh Networks Platform for Traffic Monitoring," TRB 2008 Annual Meeting CD-ROM, Jul. 30, 2007 (11 total pages).

* cited by examiner

MONITORING A MOBILE DEVICE

RELATED APPLICATIONS

This patent application is related to, and claims priority to and the full benefit of, the following United States provisional patent applications, each of which is incorporated herein in its entirety: Ser. No. 61/018,724 filed Jan. 3, 2008, and titled "Anonymous Bluetooth Traffic Monitoring", Ser. No. 61/026,565 filed Feb. 6, 2008, and titled "Anonymous Bluetooth Traffic Monitoring", and Ser. No. 61/060,304 filed Jun. 10, 2008, and titled "Anonymous Bluetooth Traffic Monitoring".

TECHNICAL FIELD

This disclosure relates to monitoring mobile devices, for example, to facilitate vehicle traffic monitoring.

BACKGROUND

Vehicle traffic monitoring typically involves collecting traffic data from vehicles traveling on a road and analyzing the collected traffic data to learn about vehicle traffic patterns. For example, vehicles traveling past a data acquisition site may be counted for use in determining a total traffic flow volume at the data acquisition site during the period of counting. Additionally, or alternatively, instantaneous speed of vehicles may be monitored to determine traffic flow speed. Each such analysis typically involves aggregating the information collected, for example, from a selected geographic area or time, and processing the aggregated information, such as by averaging, to generate measures of traffic flow. These measures are then used, for example, to predict traffic patterns, or to evaluate the adequacy of traffic infrastructure. For example, a count of vehicles traveling through a selected intersection may be used to determine whether a traffic control device is needed at the intersection, and if so, what type of traffic control device.

Vehicle traffic data collection for use in vehicle traffic analysis is an integral part of a traffic monitoring process, because without adequate and reliable data, no valid conclusions may be obtained. To enable data collection, permanently installed sensor devices and systems, including those embedded in the roadway, have been implemented to detect vehicle traffic on the roadway at the location of the sensor device. Existing devices installed for other purposes, such as cell phone transceiver devices and toll collection devices installed along roadways, also have been used to collect data of vehicle traffic, as have portable sensor devices.

SUMMARY

In one aspect, a computer-implemented process of monitoring vehicle traffic along a roadway includes a first sensor disposed at a first location along a roadway that initiates a first inquiry scan according to a Bluetooth standard, receives a first inquiry response including a first device identifier that identifies a mobile device according to a Bluetooth standard from the mobile device at a first time, stores the first identifier received in the first inquiry response, stores a first sensor identifier that identifies the first sensor, and associates the first device identifier with the first sensor identifier and a first time stamp that reflects the first time. A second sensor that is disposed at a second location along the roadway initiates a second inquiry scan according to a Bluetooth standard, receives a second inquiry response including the first device identifier according to a Bluetooth standard at a second time, stores the first device identifier, stores a second sensor identifier that identifies the second sensor, and associates the first device identifier with the second sensor identifier and a second time stamp that reflects the second time. The first device identifier is identified as being associated with the first sensor identifier and with the second sensor identifier, and, based on the identification that the first device identifier is associated with the first sensor identifier and the first time stamp as well as with the second sensor identifier and the second time stamp, at least one vehicle traffic statistic is derived based on the first time stamp, the second time stamp, the first location, and the second location.

The process may include one or more additional features. For example, the first identifier may be a MAC address of the first sensor and the second identifier may be the MAC address of the second sensor. The at least one vehicle traffic statistic may be an average vehicle speed between the first location and the second location. The first inquiry scan may include an inquiry scan routine, and the inquiry scan routine may comprise an interlaced inquiry scan routine. The inquiry scan routine may be configured to terminate when a number of responses received equals a threshold number or after completing a maximum number of iterations of the inquiry scan routine. One or more parameter of the inquiry scan routine may be adjusted, for example, by changing the threshold number of responses and/or the maximum number of iterations. The association of the first device identifier with the first sensor identifier and the first time and/or the association of first device identifier with the second sensor identifier and the second time may indicate that the mobile device was located at the first location at the first time, and/or was located at the second location at the second time. The first location may be derived from a global positioning satellite (GPS) communication. The first inquiry response may further include clock information of the mobile device, and page scan type information, one or both of which may be discarded before transmitting a name discovery request. The first sensor may initiate a third inquiry scan before transmitting a name discovery request. A route distance between the first location and the second location may be determined, and the at least one vehicle traffic statistic may be based on the route distance.

In another aspect, a computer-implemented process may include a first sensor receiving a first inquiry response according to a Bluetooth standard including a device identifier that identifies a mobile device in response to a first inquiry scan of the first sensor, associating information of the first sensor with the device identifier, a second sensor receiving a second inquiry response according to a Bluetooth standard including the device identifier in response to the second inquiry scan, and determining at least one vehicle traffic statistic based on a comparison of the information of the first sensor associated with the device identifier and the information of the second sensor associated with the device identifier.

The process may include one or more additional features. For example, the at least one vehicle traffic statistic may be a travel time between a location of the first sensor and a location of the second sensor.

In another aspect, a computer-implemented method of monitoring movement of a mobile device includes initiating, in a sensor, an inquiry scan according to a Bluetooth standard, receiving, in the sensor, an inquiry response according to a Bluetooth standard from the mobile device, storing a media access control address of the mobile device contained in the inquiry response, storing identification information of the sensor, and associating the media access control address of the mobile device with the identification information of the sensor to monitor movement of the mobile device.

In another aspect, a computer-implemented method of monitoring vehicle traffic along a roadway comprises initiating, in a sensor disposed along a roadway, a first inquiry scan according to a Bluetooth standard, receiving, in the sensor and at a first time, a first inquiry response according to a Bluetooth standard from a mobile device, the first inquiry response including a device identifier that identifies the mobile device, storing, in the sensor, the device identifier received in the first inquiry response, storing, in the sensor, a sensor identifier that identifies the sensor, associating the device identifier with the sensor identifier and a first time stamp that reflects the first time, initiating, in the sensor, a second inquiry scan according to a Bluetooth standard, receiving, in the sensor and at a second time, a second inquiry response according to a Bluetooth standard from the mobile device, the second inquiry response including the device identifier, storing, in the sensor, the device identifier received in the second inquiry response, associating the device identifier with the sensor identifier and a second time stamp that reflects the second time, identifying that the device identifier is associated with the sensor identifier at the first time and is associated with the sensor identifier at the second time, and, based on having identified that device identifier is associated with the sensor identifier at the first time as well as at the second time, deriving at least one vehicle traffic statistic based on the first time stamp and the second time stamp.

Other features also will be apparent from the description and drawings, and from the claims.

DESCRIPTION OF DRAWINGS

Like reference symbols in the various figures generally indicate like elements.

DETAILED DESCRIPTION

Figure 1:
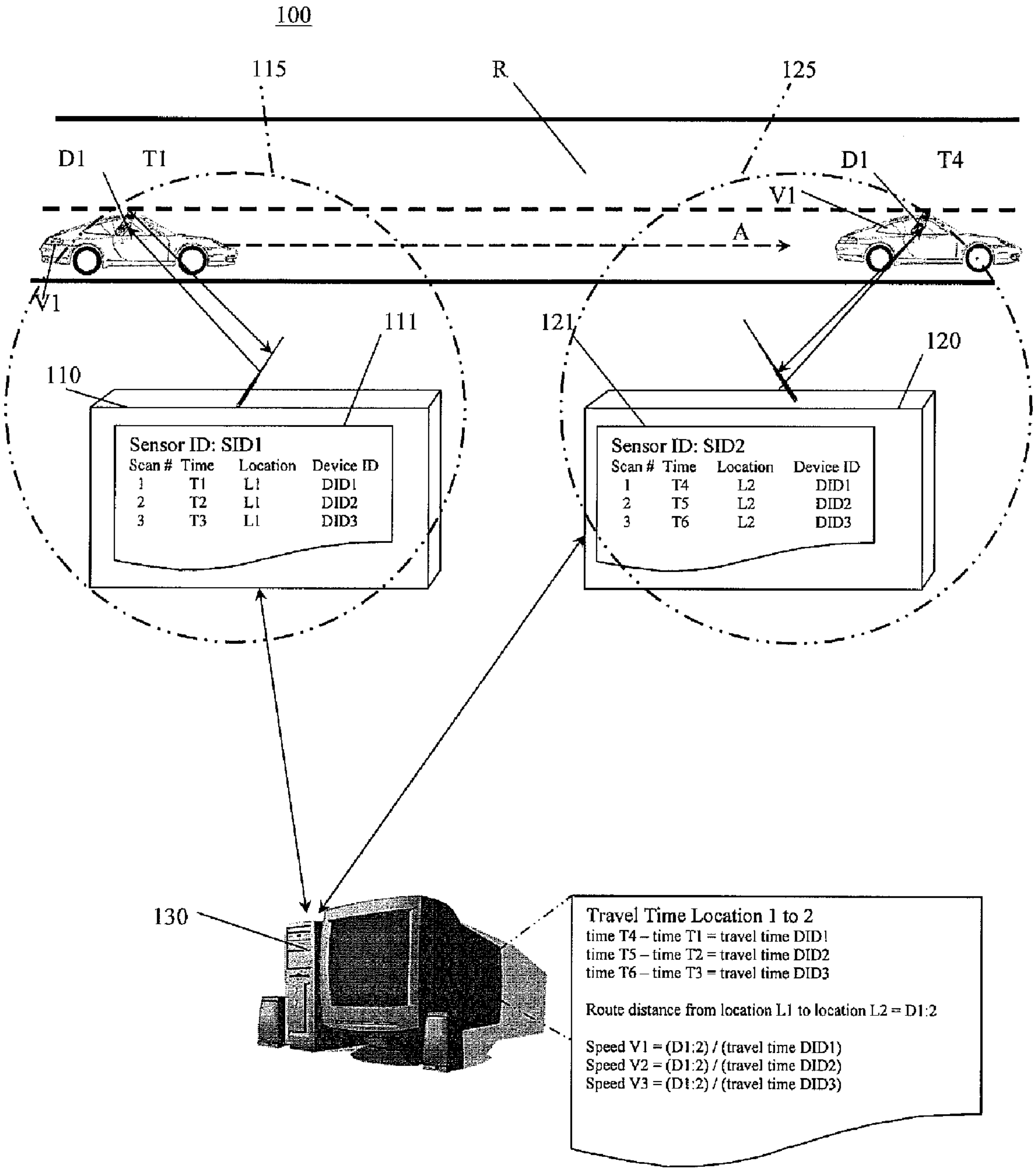
FIG. 1 illustrates a block diagram of an exemplary traffic monitoring system.
Figure 7:
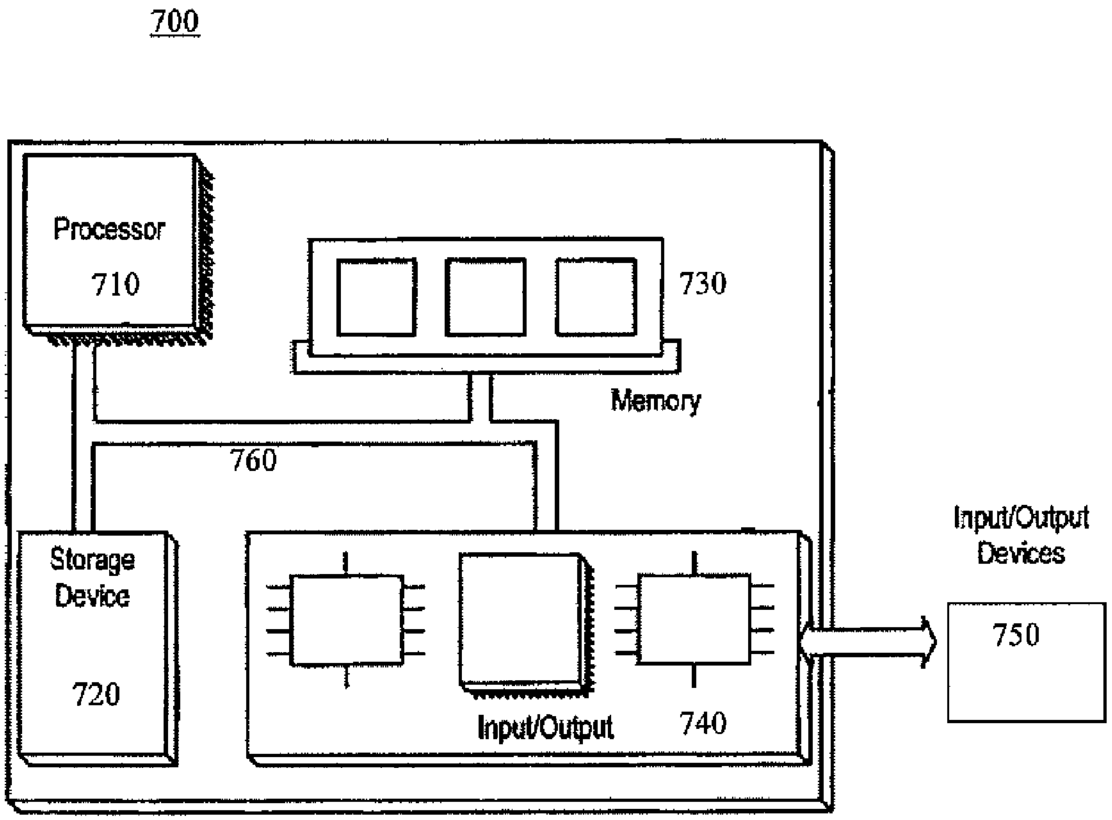
FIG. 7 is a schematic of an exemplary computer system configured to perform one or more of the processes described with respect to FIGS. 2-4, based on information received through a sensor such as illustrated in FIGS. 5 and 6.

FIG. 1 illustrates an exemplary system 100 for monitoring vehicle traffic. The system 100 includes two sensors 110, 120 that are installed along a roadway R, and a traffic monitor 130 in temporary or permanent communication with each of the two sensors 110, 120. Each of the sensors 110, 120 and the traffic monitor may include one or more of computer 700, as illustrated in FIG. 7, including a processor module 710, a storage module 720, a memory module 730, and an input/output (I/O) module 740, all connected by a system bus 760. The computer 700 includes various input/output devices 750.

Figure 5:
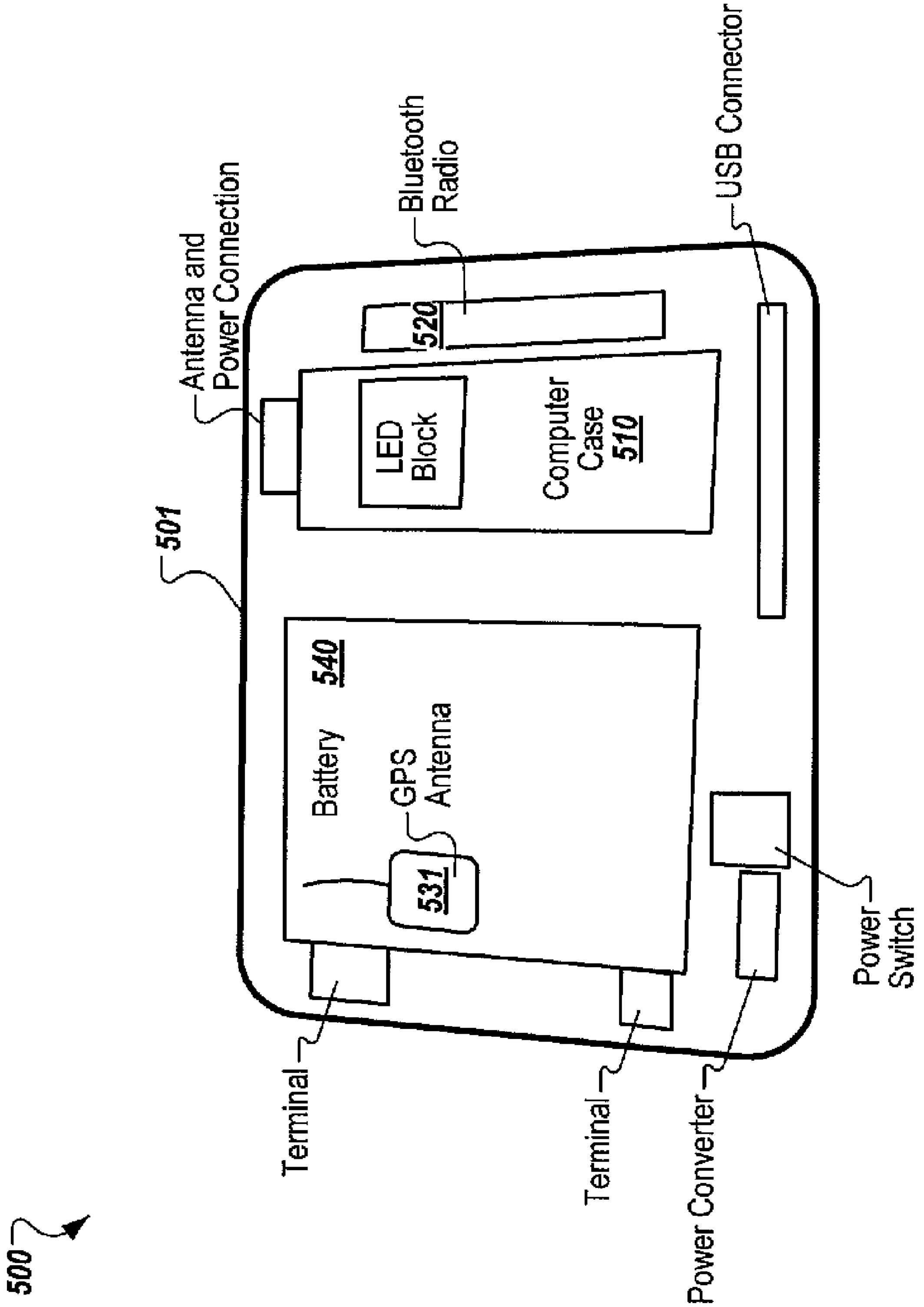
FIGS. 5 and 6 are block diagrams of an exemplary sensor for collecting traffic data.
Figure 6:
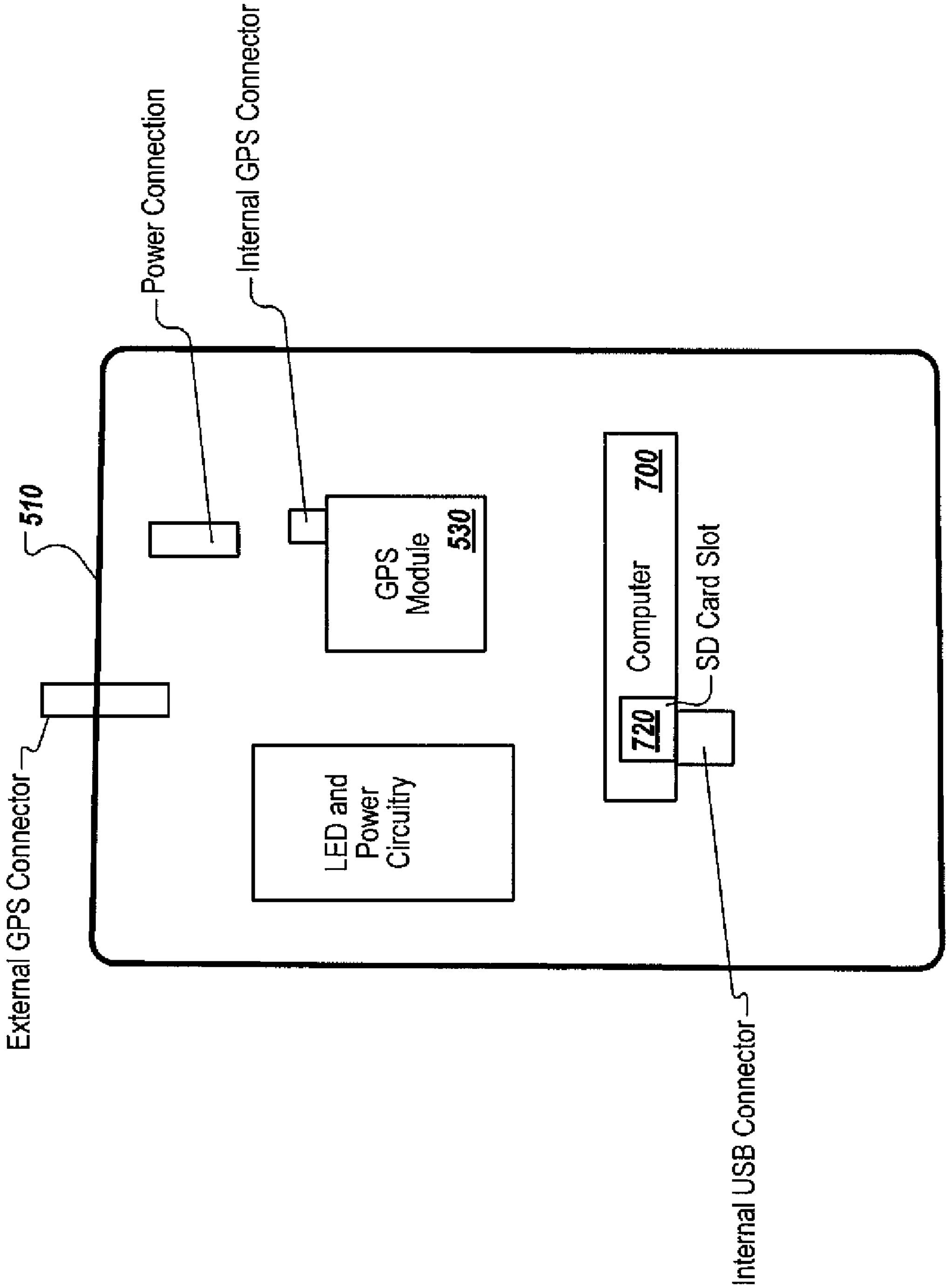

For example, the sensors 110, 120 may be configured as unit 500 having characteristics such as those illustrated in FIGS. 5 and 6. More specifically, the unit 500 includes a housing 501 in which various components are mounted. The unit 500 further includes the computer 700, including the storage module 720, mounted inside a computer case 510. The computer 700 is operable with a Bluetooth radio module 520 to communicate with discoverable Bluetooth devices, as discussed below. The computer is further operable with a GPS module 530 and GPS antenna 531 to obtain, for example, time and/or location information. The computer 700, the Bluetooth radio module 520, and the GPS module 530 are all powered by a battery 540. The computer 700 includes a computer program product stored on a computer readable medium operable to monitor discoverable Bluetooth devices, for example, by performing the processes described below.

As a vehicle V1 travels in the direction of arrow A along the roadway R, it passes within a first area 115 sufficiently proximate to the first sensor 110 that the first sensor 110 is able to detect the presence of a Bluetooth device onboard the vehicle V1. The first area 115 may be approximately equal to a communication range of the Bluetooth radio module 520, and a precise location L1 of the first sensor 110 may be attributed to all places within the first area 115. While the first area 115 and the second area 125 are illustrated as round in shape, associated with an omni-directional antenna, the first area 115 and/or the second area 125 may have other shapes, such as those associated with a yagi, or other directional, antenna. Accordingly, if desired, the first area 115 and/or the second area 125 may be configured to cover only portion of the roadway R, such as the lanes of a selected direction of travel, or a selected one of multiple lanes of common travel direction. For example the first area 115 and/or the second area 125 may be limited to lanes restricted to high occupancy vehicles, if desired. Conversely, the first area 115 and/or the second area 125 may be configured so as to cover all lanes at an intersection or highway interchange, including exit and entrance ramps, if desired. Additionally, the sensors 110 and 120 are installed such that the first area 115 and the second area 125 do not overlap. Thus, where the sensors 110 and 120 include Bluetooth radio modules 520 having a class 1 Bluetooth radio, the first and second locations L1 and L2 are selected at a sufficient distance to reduce the possibility that a discoverable Bluetooth device could receive a communication from each of the sensors 110 and 120 at the same time, for example a distance more than one mile. Such spacing of the sensors 10 and 120 may additionally serve to reduce the effect of the uncertainty associated with attribution of the first location L1 to all locations within the first area 115, and attribution of the second location L2 to all locations within the second area 125.

The first sensor 110 collects an identifier DID1 of a discoverable Bluetooth device D1 in the vehicle V1 as the vehicle V1 drives along the roadway R through the first area 115 at a first time T1. The first sensor stores the identifier of Bluetooth device DID I on a storage medium 111 along with other information, including an indication of the first time T1. Subsequently, at a second time T4, after traveling along the roadway R, the vehicle V1 passes through the second area 125 sufficiently proximate to the second sensor 120 that the second sensor 120 is able to detect the presence of the Bluetooth device onboard the vehicle V1. The second sensor 120 collects the identifier DID I of the Bluetooth device D1 and stores the identifier DID1 of Bluetooth device D1 on a storage medium 121 along with other information, including the second time T4. The first sensor 110 and the second sensor 120 each collects and stores identifiers for multiple discoverable Bluetooth devices of multiple vehicles as they pass the sensors 110, 120. The multiple discoverable Bluetooth devices may be detected, and the identifiers collected and stored, in a single scan, in multiple scans performed at multiple times, or both.

The device identifier DID1 identifies the Bluetooth device D1, and allows a determination that the same vehicle, such as vehicle V1, traveled past both the first sensor 110 and the second sensor 120. It is not necessary, however, that the device identifier DID I contain information that identifies the vehicle V1 itself, or of an owner or operator of vehicle V1. For example, the device identifier DID1 may be a MAC address of the Bluetooth device, with no indication of how that device identifier of MAC address relates to the vehicle or owner/operator thereof. For example, a MAC address of a Bluetooth device is sufficient to enable reliable identification of the Bluetooth device D1, but without more is not sufficient to track an individual using the MAC address of a Bluetooth device, the privacy of individuals whose Bluetooth device MAC address is collected is not at risk. To further address privacy concerns, only a portion of the MAC address may be used as the identifier, or the identifier may be derived from the MAC address, such that even the complete MAC address is not stored. Thus, even if it becomes possible to track an individual using a Bluetooth device MAC address, the system 100 may protect the privacy of individuals from whom or with respect to which it collects device identifiers.

As illustrated, the first sensor 110 collects and stores the identifier DID1 of the device D1 at time T1. Additionally, the first sensor 110 stores an indication L1 of the location of the first sensor 110 and an indication (scan 1) of the scan in which the identifier DID1 of the device D1 was collected. The first sensor 110 also collects and stores identifiers DID2, DID3 of other discoverable Bluetooth devices that pass the first sensor 110. As illustrated, the identifier DID2 is collected at a time T2 in scan 2, and DID3 is collected at a time T3 in scan 3. All three identifiers DID1, DID2, and DID3 are attributed with the location L1. Additionally, the first sensor 110 may store its own identifier SID1. Similarly, the second sensor 120 collects and stores identifiers and other information on the storage medium 121. For example, the second sensor 120 collects and stores the identifier DID1 of the device D1 of the vehicle V1 at a time T4. The second sensor 120 also stores the number of the scan in which the identifier DID1 was collected and an indication L2 of the location of the second sensor 120. The identifiers DID2 and DID3 were collected from discoverable Bluetooth devices at times T5 and T6, and in scans 2 and 3, respectively, of the second sensor 120. The second sensor 120 also stores its own identifier SID2.

While the sensors 110 and 120 are shown collecting the same set of identifiers DID1-DID3, each sensor 110, 120 may additionally collect and store identifiers and other information for any discoverable Bluetooth devices that enter areas 115 and 125, respectively. This is true whether or not another one of the sensors collects and stores, or fails to collect and store, an identifier and other information associated with such discoverable Bluetooth devices. This failure may be due, for example, to a vehicle exiting the roadway at a location after the first sensor 110 and before the second sensor 120, turning around before reaching the second sensor, stopping before reaching the second sensor, or a simple failure of the sensor to collect an identifier of a device as it passes the sensor.

The sensors 110, 120 communicate the collected identifiers and the additional information to the traffic monitor 130. The traffic monitor 130 analyzes the collected identifiers and other information to determine traffic statistics for vehicles having an onboard discoverable Bluetooth device for which an identifier was collected at both of the sensors 110, 120. For example, the traffic monitor 130 may generate, store, and/or display a travel time for the vehicle V1 to travel from the first area 115 proximate the first sensor 110 to the second area 125 proximate the second sensor 120 by taking the difference of time T4 when the identifier DID1 was collected at the second sensor 120 and the time T1 when the identifier DID I was collected at the first sensor 110. Additionally, an average speed for the vehicle V1, at least during travel from the first area 115 proximate the first sensor 110 to the second area 125 proximate the second sensor 120, is calculated by dividing the travel time of the vehicle V1 between the first and second areas 115 and 125, represented by the difference between the time T4 and the time T1, by a distance between the first location L1 and the second location L2. The distance between the first location L1 and L2 may be determined and provided to the traffic monitor for this purpose. For example, the route distance may be measured empirically, or it may be estimated based on a comparison of location coordinates provided by the GPS module 530.

Additionally, the traffic monitor 130 may analyze the collected information to determine traffic statistics for vehicles carrying a discoverable Bluetooth device for which an identifier was collected at only a single sensor. For example, vehicle traffic flow volume may be determined by analysis of a sum of the number of different discoverable Bluetooth devices for which an identifier was collected. As another example, if a vehicle is stopped or moving slowly, an identifier of a device in the vehicle may be collected and stored in multiple scans over a period of time. This may occur, for example, when the vehicle is moving slowly and, thus, remains within communication range of a single sensor for a relatively long period of time, or when the vehicle is stopped, such as at a traffic light. A residence time, or time that a vehicle remained within range of the sensor, may be determined by the difference between the first and last times the identification information is collected from a discoverable Bluetooth device associated with the vehicle. As another example, a speed of the vehicle may be determined by dividing the residence time into a distance associated with the communication range of the sensor.

Figure 2:
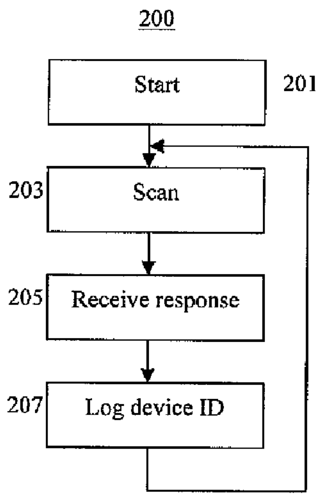
FIGS. 2 and 3 are flow charts illustrating exemplary processes for collecting traffic data.

FIG. 2 is a flow chart illustrating an exemplary process for collecting traffic data. Specifically, the sensors 110, 120 perform a data collection process 200 to collect the identifier of one or more discoverable Bluetooth device. The sensors 110, 120, begin (201) when a command is provided by a user, such as by initiating a computer program product stored on a computer readable medium, such as the storage module 720, operable to execute the process 200. Alternatively, the sensors 110, 120, may be configured to begin (201) automatically when the sensors 110, 120 are powered on and an operating system of the computer 700 is initialized. Once begun, the sensors 110, 120 then perform a scan routine (203) to collect identification information from discoverable Bluetooth devices within the first area 115 and within the second area 125, respectively. Accordingly, the scan routine is performed according to a Bluetooth standard. For example, the device inquiry routine of the Bluetooth generic access profile may be used to scan (203) for discoverable Bluetooth devices. Thus, the scan (203) includes transmitting multiple generic inquiry requests according to a Bluetooth standard via an I/O device 750 in the form of the Bluetooth radio module 520. While the scan routine is performed according to a Bluetooth standard, the sensors need not, necessarily, perform additional processes otherwise contemplated by the Bluetooth standard. For example, the sensors do not necessarily proceed to perform a name discovery routine.

In response to a scan (203), the sensors 110, 120 may receive one or more response (205) from a discoverable Bluetooth device that received the inquiry request of the scan (203). Each response includes, among other things, a device identifier in the form of a MAC address. The sensors 110, 120 store a device identifier identifying the Bluetooth device sending the response. as the device identifier may be the device MAC address received in the responses (207), a portion of the MAC address, or an identifier derived from the MAC address, such as a value that is the result of a transform applied to the MAC address. The MAC addresses, or other identifiers, may be stored as the identifier of the responding Bluetooth device. The device identifier may be stored on the storage module 720, on the memory module 730, or on an I/O device 750 configured as a storage or memory device and connected to the I/O module 740. The process 200 then continues to scan for discoverable Bluetooth devices (203). Other information of the Bluetooth device included in the responses, such as clock information and page scan type information, may be ignored or discarded, if desired. Alternatively, this additional information included in the response (205) may be used with the MAC address to create another arbitrary identifier. Similarly, less than all of the MAC address, or some other value derived from at least a portion of the MAC address, may be used as the identifier, and stored by the sensor receiving the response.

Optionally, when the data collection process begins (201), an electronic log file may be created or accessed on the storage module 720, memory module 730, or on an I/O device 750 configured as a storage or memory device. A sensor identifier SID1 that identifies the first sensor 110, for example, is stored in the log file as an indication that the log file was created by or on the first sensor 110, and as an indication that any device identifiers stored in the log file were collected by the first sensor 110 and at the first location L1 of the first sensor. The sensor identifier SID1 may be the Bluetooth MAC address of the sensor 110 creating the log file. Alternatively, the sensor identifier SID1 may be only a portion of the MAC address of the sensor 110, a derivative of the MAC address of the sensor 110, or any other value, including an arbitrary value.

Other information may also be stored in the log file when the data collection process begins. For example, an indication L1 of the location of the sensor 110, and an indication TO of the time and date when the process 200 began (201) may be stored in the log file. The location indicated by the indication L1 and the time and date indicated by the indication T0 may be obtained by an I/O device formed as the GPS module 530, and may additionally be used to set the system clock of the sensor 110. Furthermore, in addition to storing the device identifiers of the Bluetooth devices sending a response (205), the sensors 110, 120 may store in the log file an indication of the date and time that the response was received (205), such as the date and time indicated by the system clock. Finally, the sensors 110, 120 may store in the log file information indicating the number of the scan for which the response was received. Thus, each device identifier may be associated in the log file with various additional pieces of information, that indicate that the particular Bluetooth device identified by the device identifier was located at the location indicated at the time and date indicated.

Referring more specifically to the scan (203) and receiving responses (205) performed by the sensors 110, 120, in order to locate discoverable Bluetooth devices, the sensors 110, 120 must scan multiple channels employed in the Bluetooth protocol. A typical Bluetooth inquiry scan can take 5 seconds or more to complete the process of transmitting an inquiry request and receiving responses on all 32 communication channels reserved for such requests. While this may be acceptable for slow-moving traffic, such as pedestrian traffic, vehicle traffic may not be within range of the sensor for long enough to be detected by the typical Bluetooth inquiry scan. Thus, the specific scan routine (203) performed by a sensor may determine whether the desired information is collected, and whether the information is collected reliably and/or efficiently. For example, a discoverable Bluetooth device D1 within a vehicle V1 traveling at highway speeds, such as speeds greater than fifty miles per hour (50 mph) may be in range of a sensor 110, 120 for less than a few seconds. In order for the identifier DID1 of the discoverable Bluetooth device D1 to be collected by the sensors 110, 120 in such an environment, the scan (203) may need to be configured to collect the identifier DID1 in less time, i.e., within a time period in which the device D1 is within communication range of the sensors 110, 120. The scan (203) may be configured by determining, for example, a maximum number of responses to receive (205), a maximum time to scan (203), a maximum number of scan routines (203) to perform, or other scan parameter. An exemplary process configured by determining a maximum number of responses to receive and a maximum time to scan is illustrated in FIG. 3.

Figure 3:
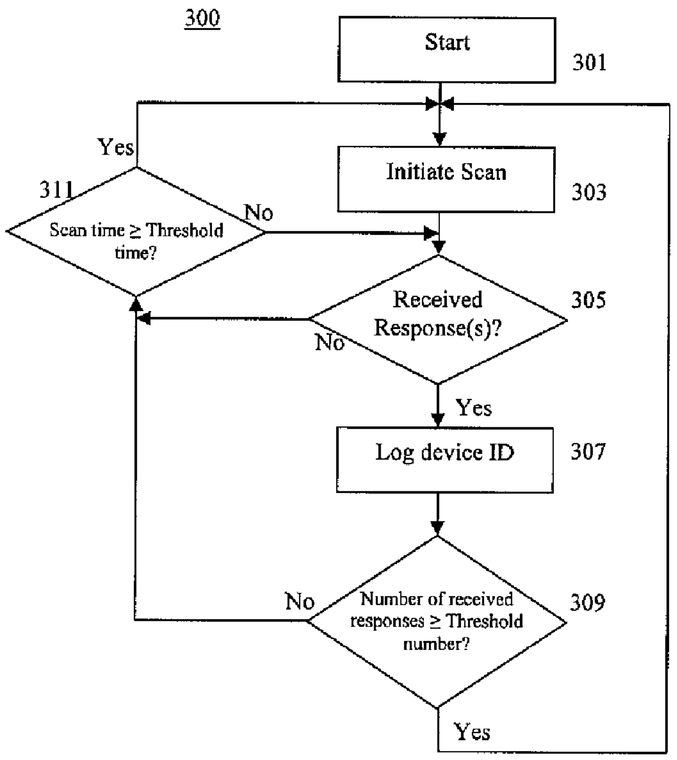

FIG. 3 is a flowchart illustrating an exemplary process 300 for collecting Bluetooth device identifiers in which a threshold number of responses and a threshold scan time have been determined. The process 300 begins (301) when the sensor is activated, and, as with process 200 described above, a log file may be created and/or accessed on a storage medium of the sensor and a location indication, a time indication, and a sensor identifier may be stored in the log file. The sensor then initiates a scan (303), which includes an interlaced Bluetooth general inquiry scan routine having a duration of approximately 1.28 seconds. The interlaced Bluetooth general inquiry scan routine transmits an inquiry request and listens for responses on all 32 channels in a pseudo-random pattern within the approximately 1.28 second duration. After initiating the scan (303), a determination is made as to whether a response has been received (305). If a response has been received, then a device identifier is stored in the log file (307) along with the time, date, location, and the number of the scan, as discussed above. After logging the device identifier and other information (307), a determination is made as to whether a number of responses received is greater than, or equal to, a threshold number. If the determination is made that the number of responses received is greater than, or equal to, the threshold number of responses (309), then the scan may terminate and the process 300 may initiate a new scan (303).

The threshold number may be user-defined to achieve a desired scanning characteristic. For example, the lower the threshold number, the sooner the scan terminates and the process 300 will initiate a new scan 303. This may result in more frequent scans, and a greater opportunity to collect the same identifier from the same device multiple times at the same sensor. Conversely, as the threshold number increases, it becomes less likely that the scan will terminate due to receiving the threshold number of responses. This may allow for the scan to continue for a greater duration, and start a new scan (303) less frequently. The longer scans may have less likelihood of collecting the same identifier from a device multiple times.

If, instead, the determination is made that the received number of responses is less than the threshold number (309), or if the determination is made that no response has been received (305), then the determination is made as to whether the scan time, i.e., the duration of the scan, is greater than, or equal to, a threshold time (311). If the scan time is less than the threshold time, then the process returns to make another determination whether a response has been received (305). If, instead, the scan time is greater than, or equal to, the threshold time, which indicates that the scan duration has met or exceeded a desired maximum time, then the process 300 may terminate the scan and proceed to initiate a new scan (303).

The threshold time may be selected as a number sufficient to allow for completion of an integer number of the approximately 1.28 second duration interlaced general inquiry scan routine, assuming that the scan is not terminated sooner by making the determination that the threshold number of responses has been reached. Accordingly, instead of making a determination as to whether the scan time is greater than or equal to a threshold time (311), the process 300 may alternatively, or additionally, make a determination as to whether a threshold number of scan routines have been completed. As with the threshold number of responses, the threshold time (or number of scan routines) may be selected to achieve a desired scanning characteristic. For example, a higher threshold time will result in longer scan duration, which may reduce the number of redundant device identifiers collected at a given sensor.

Figure 4:
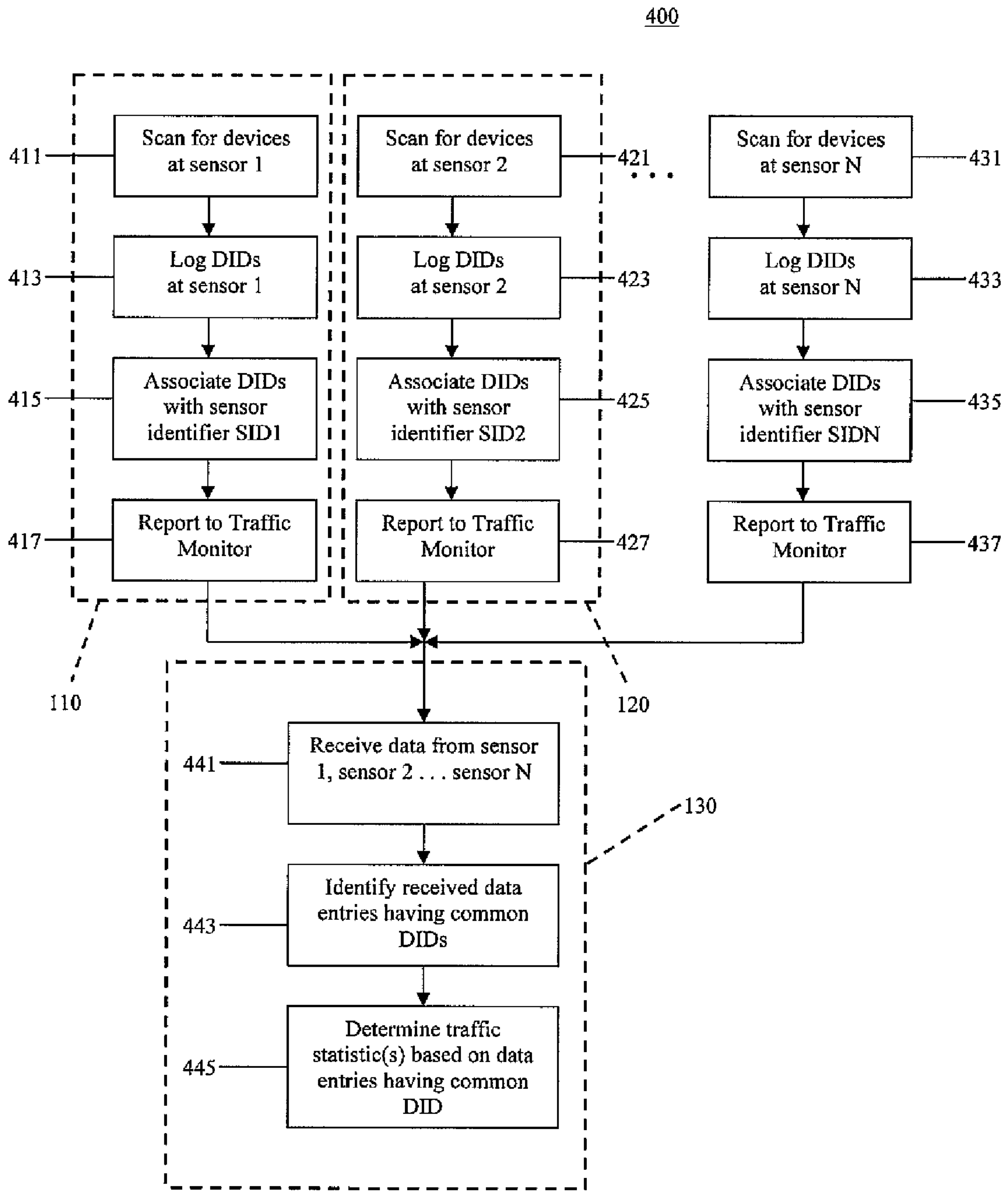
FIG. 4 is a flow chart illustrating an exemplary process for monitoring traffic.

FIG. 4 is a flow chart illustrating a process 400 for determining one or more traffic statistic. The process 400 includes scanning, at multiple sensors, for discoverable Bluetooth devices (411, 421, 431). If any identifiers of Bluetooth devices are received during the scan (411, 421, 431), the device identifiers, such as the MAC addresses of responding Bluetooth devices, are stored on a computer readable medium (413, 423, 433). The device identifiers collected by the sensors are also associated with a sensor identifier (415, 425, 435). The association (415) may be performed by storing each device identifier in a log file containing an identifier identifying the sensor that collected the device identifier. The process 400 further includes reporting the collected device identifiers to a traffic monitor (417, 427, 437). Such reporting (417, 427, 437) may be performed, for example, automatically on a periodic basis, on a continual basis, or a single time, such as when the sensor has completed collecting device identifiers. As illustrated in FIG. 4, the first sensor 110 and the second sensor 120, for example, may perform the scan for devices (411, 421), logging received device identifiers (413, 423), associating the device identifiers with the identifier SID1, SID2 identifying the sensor 110, 120 (415, 425), and reporting to the traffic monitor 130 (417, 427).

The traffic monitor 130 receives the data reported from the sensors (441), including the collected device identifiers associated with the identifier identifying the sensor that collected the device identifier. The traffic monitor 130 also receives additional information stored by the sensors, including, for example, the time and date that the device identifier was collected and the location of the sensor when the device identifier was collected. The traffic monitor 130 may analyze the data received from the sensors 110, 120 to identify device identifiers that were collected in association with two or more sensors (443). The traffic monitor may then determine traffic statistics based on the association of a device identifier with two or more sensors (445). Additionally, the determination of the traffic statistics may be made (445) based on the additional information stored by the sensors and reported to the traffic monitor 130.

For example, the determination (445) may be made, based on the association of a device identifier with two sensor identifiers, that the vehicle carrying the device traveled along a route between the locations of the two sensors identified by the sensor identifiers. Furthermore, if time information was also stored by the sensors, the traffic monitor 130 may determine (445) a time of travel for the vehicle between the locations of the sensors by determining the difference between the times the device identifier was collected at the two sensors. Additionally, if location information was stored by the sensors, the traffic monitor 130 may determine (445) a speed of travel for the vehicle between the locations of the sensors by dividing the time of travel between the sensors into the route distance between the locations of the sensors.

In an exemplary use, data collection is performed for vehicles traveling on a section of freeway. Portable sensors are located approximately 1.2 miles apart along the route of the freeway, where each is installed at the gore of an off-ramp at two successive interchanges on the freeway. Each Bluetooth sensor includes a class one Bluetooth transceiver, a central processing unit, a micro SD card for non-volatile memory, and a GPS receiver. Each sensor is powered through a 12-volt battery and housed in a weather-proof non-metallic container. The sensors are positioned near a guard rail post near each off-ramp, and secured in place with a lock and cable.

Each sensor is powered on by a technician operating a switch. On power-up, each sensor automatically performs a power-on test sequence during which each sub-system is checked for faults. After the power-on test sequence, the GPS receiver is automatically activated and the system waits until a valid GPS location solution is returned from the GPS receiver. The GPS receiver returns a standard NEMA coded message stream containing the geodetic coordinates of the sensor, including latitude, longitude, elevation, and time reference information. These values are automatically stored in a local data file on the Micro-SD card. Upon receiving a valid reference time from the GPS sub-system, the central processing unit system clock is automatically initialized based on the time reference information, and the sensor automatically enters a data collection mode.

During the data collection mode, each sensor is configured to periodically initiate a Bluetooth inquiry scan request in an interlaced mode. A complete interlaced inquiry scan routine takes approximately 1.28 seconds. During each scan, a unit alternatingly transmits an inquiry request on 32 Bluetooth channels and listens for inquiry responses in pairs, and in a pseudo random order. For example, for a complete interlaced inquiry scan routine, a sensor may transmit an inquiry request on a first channel of the 32 channels, transmit an inquiry request on a second channel of the 32 channels, listen for responses on the first channel, then listen for responses on the second channel. The sensor repeats this pattern until all 32 channels have been scanned, again, in pseudo random order. It should be understood that the Bluetooth standard involves frequency hopping, where each channel comprises a predetermined pattern of frequency hops. Each Bluetooth inquiry scan comprises, for example, 4 complete interlaced inquiry scan routines and takes approximately 5.12 seconds to complete. A maximum threshold time is set for the Bluetooth inquiry scans at approximately 5.25 seconds, and each sensor is configured to initiate a new Bluetooth inquiry scan if the threshold time is reached. The approximately 5.25 second threshold time allows, for example, some delay between terminating one complete interlaced inquiry scan routine and initiating a subsequent complete interlaced Bluetooth inquiry scan routine, some delay after terminating the fourth complete Bluetooth interlaced scan routine and initiating a subsequent Bluetooth inquiry scan, and/or some other additional feature, such as, for example, an error check.

Specifically, in one example, one Bluetooth inquiry scan is initiated and no responses are received within an approximately 5.25 second period of time from the initiation thereof, then the Bluetooth inquiry scan is terminated, and a subsequent Bluetooth inquiry scan is initiated. Alternatively, however, an indication that no responses were received in response to the Bluetooth inquiry scan may be stored in a data file labeled with the Bluetooth MAC address of the sensor. The indication, such as a MAC address of 00:00:00:00:00, is and appended with a date-time stamp indicating the approximate time of initiation of the Bluetooth inquiry scan for which a response was received. The data storage is enforced at the end of each Bluetooth inquiry scan in which a response is received.

After another Bluetooth inquiry scan is initiated, two responses are received within an approximately 5.25 second period of time from the initiation of the subsequent Bluetooth inquiry scan, after which the subsequent Bluetooth inquiry scan is terminated, and another subsequent Bluetooth inquiry scan is initiated. For each Bluetooth response received, the sensor records on the micro SD card of the sensor the MAC address of the responding unit and an indication of the date and time when the response was received. Other information recorded in the data file on the micro SD card includes the scan number, and the duration of the scan from which the response was received. This data is stored in the data file labeled with the Bluetooth MAC address of the sensor, and the data storage is enforced at the end of each Bluetooth inquiry scan in which a response is received.

After yet another Bluetooth inquiry scan is initiated, four responses are received within approximately 3.5 seconds, and the Bluetooth inquiry scan is terminated before reaching an approximately 5.25 second period of time. Information from each of the four responses is stored as described above in the data file on the micro SD card of the sensor that received the responses. A subsequent Bluetooth inquiry scan is then initiated, and the sensor automatically continues operating in this way until the battery is unable to supply adequate power for normal operation, or until the scanning is terminated by a technician. If the sensor ceases operation due to inadequate battery power, little or no data is lost due to the enforcement of the data storage after each Bluetooth inquiry scan.

The battery capacity allows for continuous unattended operation of each sensor for up approximately six days. After six days of operation, the sensors are retrieved from the field. The micro SD card from each sensor is removed and the data from each micro SD card are transferred to a central computer for processing. Each micro SD card contains three files for each period of data collection operation. The three files are the data file including information obtained from the Bluetooth responses recorded by the sensor, a GPS file including the geodetic information reported by the GPS receiver, and an info file including versioning and other information about each sensor. Each file is named using the MAC address of the sensor, and a date-time stamp that indicates an approximate time that scanning begins and that is based on the time reference information from the GPS receiver. The files are appended, respectively, with either 'data', 'gps' or 'info' to indicate the type of information included in the file. At the central computer, the Bluetooth data collected on the freeway is processed and correlated to obtain valid traffic information. The central computer is a Windows platform machine running custom software configured to read and process the data. The processing is accomplished in three phases or steps.

In the first step, data from each sensor is read into the computer and is processed to obtain detection records. A detection record represents one instance of a vehicle passing a sensor. A single vehicle containing a mobile Bluetooth device may have a response recorded more than one time as it enters, passes through, and/or exits the sensor's detection area. The lower the speed of the vehicle, the higher the probability is of detecting the vehicle more than once. To obtain the detection records, each recorded Bluetooth response is examined to determine whether any other recorded Bluetooth response with the same device MAC address has been recorded within two minutes before or after the time of the recorded Bluetooth response. All recorded Bluetooth responses with the same device MAC address that are separated by less than two minutes are combined into a single detection record. The detection record includes the device MAC address, the number of recorded Bluetooth responses that contained the device MAC address, the date and time of the first recorded response that contained the device MAC address and that was part of the detection record, and the date and time of the last recorded response that contained the device MAC address and that was part of the detection record. A time value equal to a median of the date and time of the first recorded response and the date and time of the second recorded response is attributed to the detection record as the approximate date and time of the time record.

Next, the GPS data file is read, and the latitude and longitude values stored by each sensor are recorded. The distance between sensors is computed based on great-circle distances. Additionally, a user is prompted to manually enter a value of the route distance between the two sensors, which value replaces the great-circle distance. The great-circle distance is used if the distance is unknown or if a value is not entered by the user for another reason.

Next, the computer identifies detection records of different sensors that contain the same device MAC address. Specifically, for each detection record, the detection records are searched to identify detection records that contain the same device MAC address and that have a time value within 30 minutes of a time value of the detection record. If a detection record having a matching device MAC address is identified, a paired detection record is created that links the detection records having the same device MAC address. A paired detection record consists of the device MAC address, the time value of one of the detection records, the time value of the other detection record, and the difference between the two time values, which is a measure of the passage time between the one detection record and the other detection record. All detection records are processed in this manner. If two or more detection records having a matching device MAC address are identified within a 30 minute period, the earliest record is used to create a paired detection record.

Next, paired detection records are filtered for outliers. Specifically, paired detection records are sorted by the time value of the first detection record. For a given paired detection record, all the paired detection records, but not more than the 15 nearest paired detection records having a time value before, and all, but not more than the 15 nearest paired detection records having a time value after the given paired detection record, are used to determine the difference between the 75th and 25th percentile of passage times. This measure, referred to as the interquartile range, forms the basis for the filter. If the passage time of the given paired detection record falls outside the boundary defined by plus or minus three inter-quartile ranges from the median passage time of the paired detection records (e.g., 31 paired detection records), then it is considered an outlier and omitted from any further processing. All paired detection records are filtered in this manner. The mean and standard deviation of passage times are then determined for successive five-minute increment periods. Mean and standard deviation of speed ate similarly calculated by dividing the distance value between the sensors by the corresponding travel times.

A number of exemplary implementations have been described. Nevertheless, it will be understood that various modifications may be made without departing from the spirit and scope of the technology discussed herein. For example, the system 100 may be configured differently from the configurations described and illustrated above. In another configuration, the traffic monitor 130 may be eliminated and the functions and features associated therewith may instead be included in sensor the first sensor 110, the second sensor 120, or another device. Similarly, in another configuration, two or more sensors 10 may be installed approximately at the first location L1, and responses having duplicate device identifiers DID1 and recorded within a selected amount of time of one another may be combined in a single detection record. Additionally, the processes described above, and those claimed below, may be performed by sensor devices having a different configuration, including hardware and/or software, than those described above. Likewise, the devices and systems described above may be used in processes different from those described above and claimed below. For example, the systems and devices may be used to monitor pedestrian traffic, inventory traffic, or movement of other item.

In another embodiment, the devices also could be permanently mounted for continuous reporting, or quickly deployed for surveys or events. Wireless data networking (or land-line links if permanently installed) options could be used to transmit the records to a database for real-time monitoring. If real-time monitoring is not a concern, the data records could simply be stored locally and downloaded periodically as convenient. Matching of the unique Bluetooth address and related travel time and OD analysis would be performed at the database.

The Bluetooth Traffic Monitoring Concept can be extended to include volume estimates as follows. Bluetooth capable devices are positioned on all legs of an intersection. By logging and matching public network ID's of the devices in the traffic stream, an estimate of the volume of traffic and the turning movement proportions (number of vehicles going straight, turning left, and turning right) are obtained. Volume estimates can be obtained with a single Bluetooth device, without acquiring matching pairs from two such devices. Such information is valuable in assessing signal timing. The same concept can be used to estimate throughput volume, routing, and turning movement logistics on any type of transportation network facility, be it roads, transit, or pedestrian movement.

What is claimed is:

1. A computer-implemented method of monitoring vehicle traffic along a roadway comprising: initiating, in a first sensor disposed at a first location along a roadway, a first inquiry scan according to a communications protocol; receiving, in the first sensor and at a first time, a first inquiry response according to the communications protocol from a mobile device, the first inquiry response including a media access control address of the mobile device; storing, in the first sensor, a first device identifier identifying the mobile device based on the first inquiry response, wherein the first device identifier is based on the media access control address of the mobile device; storing, in the first sensor, a first sensor identifier that identifies the first sensor; associating the first device identifier with the first sensor identifier and a first time stamp that reflects the first time; initiating, in a second sensor, a second inquiry scan according to the communications protocol, wherein the second sensor is disposed along the roadway at a second location that is separated by a distance from the first location such that a first area associated with a communication range of the first sensor and a second area associated with a communication range of the second sensor are distinct; receiving, in the second sensor and at a second time, a second inquiry response according to the communications protocol from the mobile device, the second inquiry response including the media access control address of the mobile device; storing, in the second sensor, the first device identifier identifying the mobile device based on the second inquiry response; storing, in the second sensor, a second sensor identifier that identifies the second sensor; associating the first device identifier with the second sensor identifier and a second time stamp that reflects the second time; determining that the first device identifier is associated with the first sensor identifier and with the second sensor identifier; and based on determining that the first device identifier is associated with the first sensor identifier as well as with the second sensor identifier, deriving at least one vehicle traffic statistic based on the first time stamp, the second time stamp, the first location, and the second location.

2. The computer-implemented method of claim 1, wherein the at least one vehicle traffic statistic includes an average vehicle speed between the first location and the second location.

3. The computer-implemented method of claim 1, wherein the first inquiry scan comprises at least one inquiry scan routine, and further comprising adjusting at least one parameter of the inquiry scan routine.

4. The computer-implemented method of claim 3, wherein the at least one parameter comprises a threshold number of responses, the first inquiry scan terminating when a number of responses received equals the threshold number.

5. The computer-implemented method of claim 3, wherein the at least one parameter comprises a maximum number of inquiry scan iterations, the first inquiry scan terminating after completing the maximum number of inquiry scan iterations of the inquiry scan routine.

6. The computer-implemented method of claim 3, wherein the at least one parameter comprises an interlaced scan setting, such that the first inquiry scan comprises an interlaced scan routine.

7. The computer-implemented method of claim 1, wherein associating the first device identifier with the first sensor identifier and the first time indicates that the mobile device was located in the first area associated with the communication range of the first sensor at the first time.

8. The computer-implemented method of claim 1, wherein the first location is derived from a global positioning satellite communication associated with the first sensor.

9. The computer-implemented method of claim 1, wherein the first inquiry response further includes clock information of the mobile device, and page scan type information, the method further comprising discarding at least one of the clock information of the mobile device and the page scan type information prior to transmitting a name discovery request.

10. The computer-implemented method of claim 1, further comprising initiating, in the first sensor, a third inquiry scan before transmitting a name request.

11. The computer-implemented method of claim 1, further comprising determining a route distance between the first location and the second location, and wherein deriving at least one vehicle traffic statistic is based on the route distance.

12. The method of claim 1, wherein the communications protocol is based on frequency hopping associated with a Bluetooth standard.

13. The method of claim 1, wherein the first device identifier is same as the media access control address of the mobile device.

14. The method of claim 1, wherein the first area associated with the communication range of the first sensor and the second area associated with the communication range of the second sensor are non-overlapping.

15. The method of claim 1, wherein at least one of the first inquiry response and the second inquiry response includes a plurality of inquiry responses.

16. The method of claim 1, wherein the at least one vehicle traffic statistic includes origin-destination (OD) analysis.

17. The method of claim 1, wherein the at least one vehicle traffic statistic includes turning movement proportions that are based on at least one of a number of vehicles going straight, a number of vehicles turning left and number of vehicles turning right.

18. A computer-implemented method comprising: monitoring, in a first sensor disposed at a first location along a roadway and using a communications protocol, presence of mobile devices within a first area associated with a communication range of the first sensor; responsive to the monitoring, receiving, in the first sensor and at a first time a media access control address of the mobile device; based on receiving the media access control address of the mobile device at the first time, storing, in the first sensor, a first device identifier identifying the mobile device, wherein the first device identifier is based on the received media access control address of the mobile device; storing, in the first sensor, a first sensor identifier that identifies the first sensor; associating the first device identifier with the first sensor identifier and a first time stamp that reflects the first time; monitoring, in a second sensor disposed at a second location along the roadway and using the communications protocol, presence of mobile devices within a second area associated with a communication range of the second sensor, wherein the second location is separated by a distance from the first location such that the first area and the second area are distinct; responsive to the monitoring, receiving, in the second sensor and at a second time, the media access control address of the mobile device; based on receiving the media access control address of the mobile device at the second time, storing, in the second sensor, the first device identifier identifying the mobile device; storing, in the second sensor, a second sensor identifier that identifies the second sensor; associating the first device identifier with the second sensor identifier and a second time stamp that reflects the second time; determining that the first device identifier is associated with the first sensor identifier and with the second sensor identifier; and based on determining that the first device identifier is associated with the first sensor identifier as well as with the second sensor identifier, deriving at least one travel statistic based on the first time stamp, the second time stamp, the first location, and the second location.

19. The method of claim 18, wherein the communications protocol is based on frequency hopping associated with a Bluetooth standard.

20. The method of claim 18, wherein the at least one travel statistic includes origin-destination (OD) analysis.

21. The method of claim 18, wherein the at least one travel statistic includes turning movement proportions that are based on at least one of a number of vehicles going straight, a number of vehicles turning left and number of vehicles turning right.

22. A system for monitoring vehicle traffic along a roadway comprising: a instruction module including instructions that are executable by a processor and configured to cause the processor to perform operations including: initiating, in a first sensor disposed at a first location along a roadway, a first inquiry scan according to a communications protocol; receiving from a mobile device, in the first sensor and at a first time, a first inquiry response according to the communications protocol, the first inquiry response including a media access control address of the mobile device; based on receiving the first inquiry response, storing, in the first sensor, a first device identifier identifying the mobile device, wherein the first device identifier is based on the media access control address of the mobile device; storing, in the first sensor, a first sensor identifier that identifies the first sensor; and associating the first device identifier with the first sensor identifier and a first time stamp that reflects the first time; a second instruction module including instructions that are executable by a second processor and configured to cause the second processor to perform operations including: initiating, in a second sensor, a second inquiry scan according to the communications protocol, wherein the second sensor is disposed along the roadway at a second location that is separated by a distance from the first location such that a first area associated with a communication range of the first sensor and a second area associated with a communication range of the second sensor are distinct; receiving from the mobile device, in the second sensor and at a second time, a second inquiry response according to the communications protocol, the second inquiry response including the media access control address of the mobile device; storing, in the second sensor, the first device identifier identifying the mobile device based on the second inquiry response; storing, in the second sensor, a second sensor identifier that identifies the second sensor; and associating the first device identifier with the second sensor identifier and a second time stamp that reflects the second time; means for determining that the first device identifier is associated with the first sensor identifier and with the second sensor identifier; and a third instruction module including instructions that are executable by a third processor and configured to cause the third processor to perform operations including deriving, based on determining that the first device identifier is associated with the first sensor identifier and with the second sensor identifier, at least one travel statistic based on the first time stamp, the second time stamp, the first location, and the second location.

23. The system of claim 22, wherein the communications protocol is based on frequency hopping associated with a Bluetooth standard.

24. The system of claim 22, wherein the means for determining that the first device identifier is associated with the first sensor identifier and with the second sensor identifier comprises: an instruction module including instructions that are executable by a processor and configured to cause the processor to perform operations including determining that the first device identifier is associated with the first sensor identifier and with the second sensor identifier.

25. A system comprising: an instruction module including instructions that are executable by a processor and configured to cause the processor to perform operations including: monitoring, in a first sensor disposed at a first location along a roadway and using a communications protocol, presence of mobile devices within a first area associated with a communication range of the first sensor; responsive to the monitoring, receiving, in the first sensor and at a first time a media access control address of the mobile device; based on receiving the media access control address of the mobile device at the first time, storing, in the first sensor, a first device identifier identifying the mobile device, wherein the first device identifier is based on the received media access control address of the mobile device; storing, in the first sensor, a first sensor identifier that identifies the first sensor; and associating the first device identifier with the first sensor identifier and a first time stamp that reflects the first time; an instruction module including instructions that are executable by a processor and configured to cause the processor to perform operations including: monitoring, in a second sensor disposed at a second location along the roadway and using the communications protocol, presence of mobile devices within a second area associated with a communication range of the second sensor, wherein the second location is separated by a distance from the first location such that the first area and the second area are distinct; responsive to the monitoring, receiving, in the second sensor and at a second time, the media access control address of the mobile device; based on receiving the media access control address of the mobile device at the second time, storing, in the second sensor, the first device identifier identifying the mobile device; storing, in the second sensor, a second sensor identifier that identifies the second sensor; and associating the first device identifier with the second sensor identifier and a second time stamp that reflects the second time; an instruction module including instructions that are executable by a processor and configured to cause the processor to perform operations including determining that the first device identifier is associated with the first sensor identifier and with the second sensor identifier; and an instruction module including instructions that are executable by a processor and configured to cause the processor to perform operations including deriving, based on determining that the first device identifier is associated with the first sensor identifier as well as with the second sensor identifier, at least one travel statistic based on the first time stamp, the second time stamp, the first location, and the second location.

26. The system of claim 25, wherein the instruction module including instructions that are executable by a processor and configured to cause the processor to perform operations including determining that the first device identifier is associated with the first sensor identifier and with the second sensor identifier comprises: means for determining that the first device identifier is associated with the first sensor identifier and with the second sensor identifier.

* * * * *